United States Patent
Dutta

[19]

[11] Patent Number: 5,599,086
[45] Date of Patent: Feb. 4, 1997

[54] VEHICLE TRACK LIGHTING SYSTEM

[75] Inventor: Kalyan Dutta, Ann Arbor, Mich.

[73] Assignee: Ford Motor Company, Dearborn, Mich.

[21] Appl. No.: 466,509

[22] Filed: Jun. 6, 1995

[51] Int. Cl.⁶ .................................................. B60Q 3/02
[52] U.S. Cl. ........................... 362/74; 362/83.3; 362/285; 296/214
[58] Field of Search .................. 362/61, 74, 80, 362/83.3, 183, 282, 285, 365; 296/214

[56] References Cited

U.S. PATENT DOCUMENTS

| | | | |
|---|---|---|---|
| 1,674,340 | 6/1928 | Nock | 362/74 |
| 2,120,619 | 6/1938 | Matthiesen | 362/74 |
| 3,451,035 | 6/1969 | Baldwin . | |
| 3,474,381 | 10/1969 | Baldwin . | |
| 4,173,382 | 11/1979 | Booty . | |
| 4,182,532 | 1/1980 | Walker, Sr. . | |
| 4,887,196 | 12/1989 | Brown et al. . | |
| 4,974,129 | 11/1990 | Grieb et al. | 362/183 |
| 5,077,643 | 12/1991 | Leach . | |
| 5,113,318 | 5/1992 | Conley | 362/285 |
| 5,128,847 | 6/1992 | Lin et al. . | |

FOREIGN PATENT DOCUMENTS

| | | | |
|---|---|---|---|
| 342345 | 11/1989 | European Pat. Off. | 362/74 |
| 167838 | 10/1982 | Japan | 362/74 |

*Primary Examiner*—Y My Quach
*Attorney, Agent, or Firm*—Damian Porcari

[57] ABSTRACT

A vehicle lighting system having an elongated track mounted to the roof of the vehicle and placed adjacent one or more seating positions. An illuminator is slidably mounted to the track and is movable along the track to illuminate a longitudinal area adjacent the seating position. Parallel rails within the interior portion of the track provide power and ground to the illuminator. The illuminator slides longitudinally along the track and contacts the rails to communicate power and ground to a bulb positioned within the illuminator. The illuminator may be moved along the track to illuminate a continuous area adjacent the vehicle seats.

1 Claim, 1 Drawing Sheet

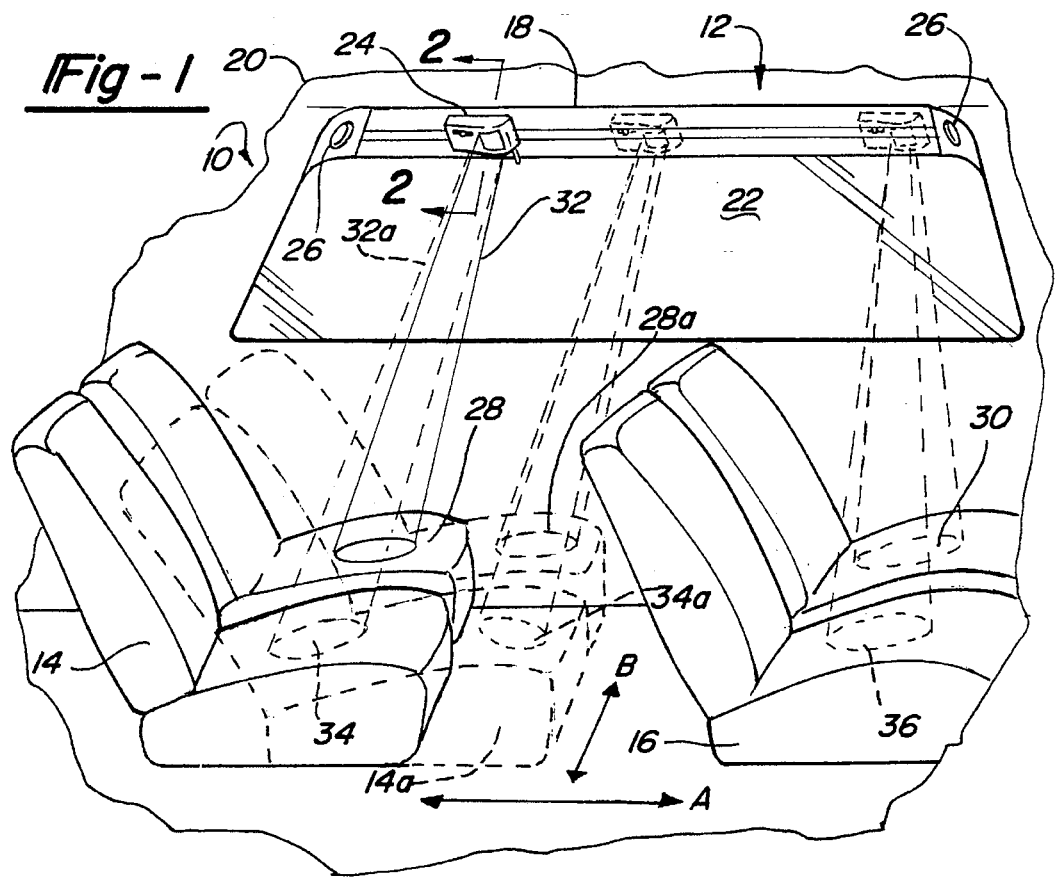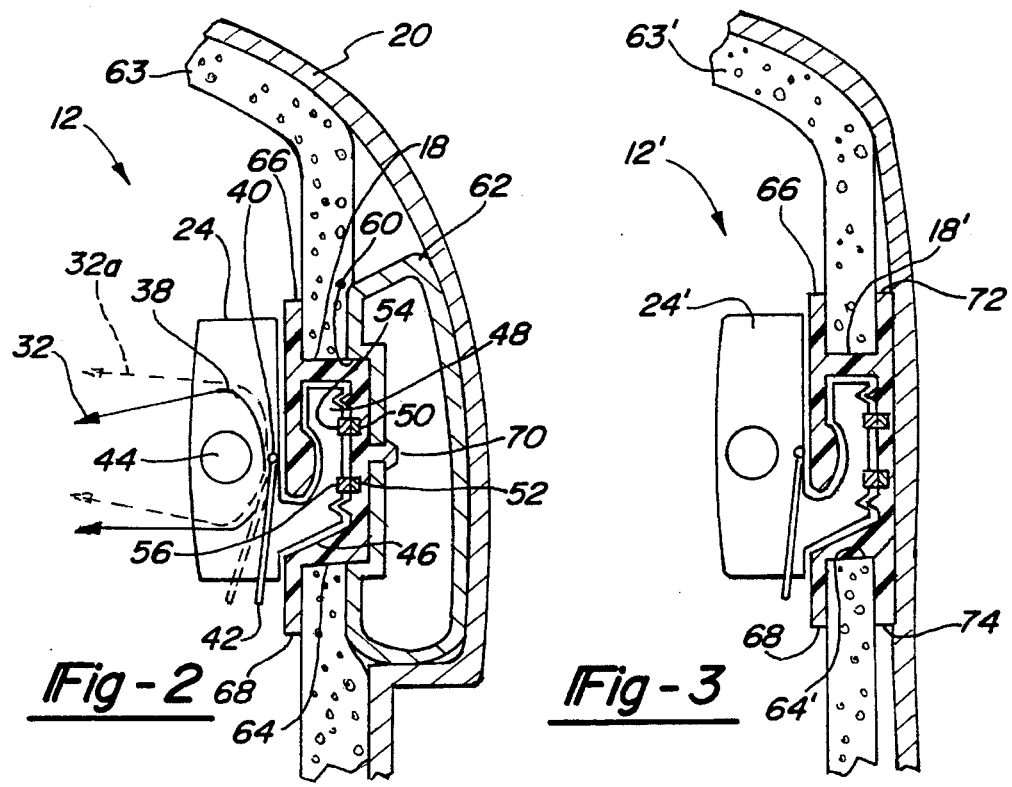

5,599,086

VEHICLE TRACK LIGHTING SYSTEM

BACKGROUND OF THE INVENTION

The present invention relates to a track lighting system for a vehicle. More specifically, the present invention provides a track light moveable along a longitudinal axis of a vehicle and being capable of illuminating two or more seating positions.

SUMMARY OF THE INVENTION

Vehicles, especially automobiles, have had stationary lights within the passenger compartment of the vehicle to illuminate a fixed seating position. Some of the stationary-style lights have been piviotably mounted in a housing to permit them to illuminate a wider area. However, the pivotal mounting does not enable the light to move with a slidable seat or reach more distant seating positions in adjacent rows. Pivotal mounting also affects the angle of illumination of different seating positions and may cast unwanted shadows.

Track lights have been widely used is architectural environments. Slidable lights move along a track and receive their electrical power from rails imbedded within the track. Architectural track lights are generally unsuited for vehicle applications because of space and power constraints in vehicles.

A type of track light has been used in commercial vehicle applications. U.S. Pat. Nos. 3,474,381 and 3,451,035 teach a method of attaching a light to the exterior of a truck trailer. The light slides within grooves. Once the light is positioned in the desired location, attaching screws fix the light to the track and pierce a cable to provide power to the light. The light is not slidable once installed and is intended to only illuminate the exterior of the vehicle.

U.S. Pat. No. 4,182,532 teaches a lighting system for illuminating the interior of a truck trailer. Transverse roof members carry a form of track lighting. The track light uses a wire to communicate power from sockets positioned longitudinally along the trailer to the light. The wire is not reeled or wound when the light is moved and may become exposed to the truck interior when the light is positioned near the socket.

It is also known to use a rechargeable light to illuminate the vehicle. The rechargeable light receives power from the vehicle when mounted in a receiver, but operates on its own battery when removed. U.S. Pat. No. 5,077,643 teaches a combination courtesy light and detachable flashlight positioned within the lower portion of a vehicle door. The light is fixed in position when connected to the vehicle door power supply and illuminates a fixed area.

It is desirable to provide a vehicle lighting system that may illuminate two or more seating positions and maintains a constant preferred angle of illumination. The system should be compact and provide an attractive appearance to the interior of the vehicle. It is further desirable to incorporate these features into a removable light that is capable of being power both from the vehicle electrical system and its own battery.

These and other advantages and features of the present invention will be shown in the following description and drawings.

SUMMARY OF THE INVENTION

The invention provides a vehicle lighting system having an elongated track mounted to the roof of the vehicle, and placed adjacent one or more seating positions. An illuminator is slidably mounted to the track and is movable along the track to illuminate a longitudinal area adjacent the seating position. Other embodiments of the invention include attaching the track substantially flush with a decorative surface of a vehicle headliner or attaching the track to the vehicle roof rail.

The elongated track may be designed to include parallel rails within the interior portion of the track to provide power and ground to the illuminator. The illuminator may slide longitudinally along the track and contact rails within track to communicate power and ground to a bulb. The illuminator may be moved along the track to illuminate a continuous area adjacent the vehicle seats.

The invention is particularly useful for vehicles having three or more rows of seats, but it may also be used for vehicles having only one or two seating rows. When used with vehicles having three rows of seats, for example vans, the track may extend from the front row to the rear most row. The illuminator may slide along the entire track and illuminate an area adjacent each row of seats. If the seats are slidable, the track may move generally parallel with the seat and maintain a constant illumination angle throughout the seat travel.

The invention may optionally permit the illuminator to emit a beam pattern moveable about an arc generally transverse to the track. The moveable beam pattern is capable of illuminating an area between two or more transverse seating positions in the vehicle. This permits one illuminator to illuminate seven or more seating positions with directed light.

Yet another embodiment of the invention teaches the use of a removable illuminator cable of operating on the vehicle power supply or powered from its own rechargeable battery. When placed within the track, the illuminator receives power from rails. When removed from the track, the illuminator may operate on its own battery power and provide a convenient, easy to use flash light for the occupants.

BRIEF DESCRIPTION OF THE DRAWINGS

FIG. 1 is a perspective view of the interior of a vehicle having a track lighting system of the present invention.

FIG. 2, is an enlarged cross-sectional view taken along the line 2—2 in FIG. 1.

FIG. 3, is an enlarged cross-sectional view of an alternative embodiment taken along the line 2—2 in FIG. 1.

DETAILED DESCRIPTION OF THE PREFERRED EMBODIMENTS

The invention will be described and illustrated in a vehicle having three rows of seats, but only two rows (middle and last) are shown. Other uses and vehicle applications are possible, including extending the light to cover three or more seating rows or using multiple lights on either side of the vehicle.

FIG. 1 illustrates the interior of vehicle 10. Vehicle lighting system 12 is positioned adjacent seating rows 14, 16. System 12 includes an elongated track 18 mounted to the vehicle roof 20 and extending along the longitudinal axis A of vehicle 10. The track is positioned generally above window side lights 22 so as to provide an overhead illuminator to the passengers. One system 12 may used to illuminate two or more rows of seats, or smaller systems may be combined to provide each passenger with their own illuminator.

System 12 further includes an illuminator 24 slidably mounted to track 18 and movable along the track to illuminate a longitudinal area adjacent rows 14, 16. Switches 26 are mounted to each end of track 18 and turn on power to illuminator 24. It is also possible to make these multiple switches "three-way" to allow them to independently control the illuminator. Another option is to include a switch on illuminator 24.

As will be more fully described below, illuminator 24 receives power from the vehicle electrical system (not shown) and emits a beam pattern of light into the passenger compartment of vehicle 10. Illuminator 24 is continuously slidable along track 18 and maintains a continuous electrical continuity with the vehicle electrical system.

System 12 is illustrated as being positioned above and adjacent to longitudinal seating positions 28, 30. Seating positions 28, 30 correspond to the last and middle rows of a three-row vehicle as is typically found in modern vans. In some vehicles, one or more seat rows may be longitudinally slidable as illustrated by row 14a. Illuminator 24 may be moved generally parallel to the movement of seating position 28, 28a and maintain a desired illumination angle. Illuminator 24 emits a beam pattern 32, generally transverse to track 18. Beam pattern 32 illuminates a continuous area adjacent track 18 including seating positions 28, 28a, and 30. The angle of beam pattern 32 may be maintained substantially transverse to seating position 28, 28a and 30 to illuminate the passenger space without casting unwanted shadows.

Illuminator 24 may also be made adjustable to illuminate transverse seating positions 34, 34a and 36. Seating positions 34, 34a, and 36 extend along the transverse axis B of vehicle 10. As shown in FIG. 2, illuminator 24 comprises a pivotal reflector 38. Reflector 38 pivots about point 40. A lever 42 adjusts the position of reflector 38. Bulb 44 is position next to reflector 38 and emits light. The emitted light is focused into beam pattern 32. Lever 42 moves reflector 38 and causes the light to refocus into beam pattern 32a. The light emitted from illuminator 24 is continuously adjustable about an arc transverse to track 18 and is capable of illuminating transverse seating positions 34, 34a and 36 (shown in FIG. 1).

Illuminator 24 is attached within track 18 as shown. Track 18 comprises a G-shaped channel cross-section. Opening 46 receives a slide portion 48 of illuminator 24. Opening 46 is positioned to be downward facing so that foreign objects are not retained in the track. Two parallel elongated rails 50, 52 extend within track 18 and provide power and ground to illuminator 24. Track 18 may be made from a non-conduction material such as plastic and two rails are needed to provide power and ground to illuminator 24. If track 18 is made from metal, the track may serve as ground and a rail insulated from the track may serve as power. Pickups 54, 56 on slide 48 contact rails 50, 52 and transfer power and ground to bulb 44.

System 12 may be attached to the roof of the vehicle in several ways. If the vehicle has been specially designed to receive the track lighting system, then track 18 may mate with a channel 60 in roof rail 62. This permits track 18 to be partially or completely received within the roof rail and provide a compact appearance. The invention may be used with existing vehicles by attaching track to an unmodified roof rail.

Roof rail 62 supports both roof 20 and track 18. Headliner 63 covers the interior surface of roof 20 and provides a decorative surface to the interior of the passenger compartment. Track 18 fits within a slot 64 in headliner 63. Flange portions 66, 68 of track 18 overlie slot 64 and cover any gaps between the headliner and track. Track 18 lies substantially flush with headliner 63. Track 18 is secured to roof rail 62 by a push fastener 70 integrally formed or subsequently attached to track 18. Other fasteners or adhesives may be used to secure the track 18 to vehicle 10.

In an alternative embodiment of the invention, the weight of system 12' may be carried solely by the headliner. FIG. 3 illustrates an alternative embodiment of the present invention in which track 18' is secured within slot 64' of headliner 63'. Track 18' includes four flanges 66, 68, 72 and 74. Flanges 66, 68, 72 and 74 are positioned on both sides of slot 64'. Headliner 63' is made from a self supporting structural foam or reinforced plastic material and is generally known as a structural headliner. Track 18' is held in position by the rigidity of headliner 63' or optionally by means of fasteners (not shown) securing track 18' to headliner 63'. Illuminator 24' slides along track 18' as previously described.

Illuminator 24, 24' may optionally include a rechargeable battery and charging circuit of the type described in U.S. Pat. No. 5,077,643 (incorporated herein by reference). Illuminator 24, 24' may be removed from track 18, 18' and used as a portable flashlight. The illuminator may be replaced within the track after use to recharge and to operate off of the vehicle power supply.

The invention has been illustrated as illuminating one side of a passenger vehicle using a single track lighting system. Other variations of the system that use multiple tracks or position the tracks transversely to the vehicle are possible without departing from the spirit and scope of the claimed invention. These and other modifications and adaptations of the invention are intended to be covered by the following claims.

What is claimed:

1. A vehicle lighting system for a vehicle having two or more longitudinal seating positions and two or more transverse seating positions comprising:

an elongated track mounted along longitudinal axis of said vehicle and attached to and carried solely by a structural headliner of said vehicle, said track including two elongated rails within said track, said rails conducting power and ground;

a switch attached to said rail interrupting said power; and an illuminator slidably mounted to said track and communicating with said power and ground rails, said illuminator being movable along said track to illuminate a continuous area between said two or more longitudinal seating positions, and being movable along an arc transverse to said track to illuminate a continuous area between said two or more transverse seating positions.

* * * * *